(12) United States Patent
Wu et al.

(10) Patent No.: US 8,253,089 B2
(45) Date of Patent: Aug. 28, 2012

(54) POINTING ERROR CORRECTING SYSTEM AND METHOD THEREOF

(75) Inventors: Jiunn-Chi Wu, Jhongli (TW); Jhih-Wei Liou, Jhongli (TW); Chi-Feng Chen, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 291 days.

(21) Appl. No.: 12/841,590

(22) Filed: Jul. 22, 2010

(65) Prior Publication Data

US 2011/0231031 A1    Sep. 22, 2011

(30) Foreign Application Priority Data

Mar. 17, 2010 (TW) .............................. 99107911 A

(51) Int. Cl.
*G05B 19/18* (2006.01)

(52) U.S. Cl. ....................................... 250/203.4; 700/56

(58) Field of Classification Search ............... 250/203.1, 250/203.3, 203.4, 548, 559.3; 700/56–64; 126/574, 601; 356/139.01, 152.1
See application file for complete search history.

(56) References Cited

U.S. PATENT DOCUMENTS

| 3,774,207 | A  | * | 11/1973 | Yaplee et al. | .................. 342/76 |
| 6,369,942 | B1 | * | 4/2002  | Hedrick et al. | ............... 359/430 |
| 6,704,607 | B2 |   | 3/2004  | Stone et al. | |

* cited by examiner

*Primary Examiner* — Seung C Sohn
(74) *Attorney, Agent, or Firm* — Harness, Dickey & Pierce, PLC

(57) ABSTRACT

The present invention discloses a pointing error correcting system and method thereof applied for a concentrated photovoltaic or solar heat energy system comprising a processing module, a driving module, a tracker and a measuring module. The method comprises steps of calculating a position of a celestial body; controlling the driving module to drive the tracker pointing toward the celestial body; calculating an error value between the pointing of the tracker and the celestial body measured by the measuring module through a coordinate transforming method; and correcting the driving module to drive the tracker pointing the celestial body.

15 Claims, 13 Drawing Sheets

POINTING ERROR CORRECTING SYSTEM AND METHOD THEREOF

FIELD OF THE INVENTION

The present invention relates to a pointing error correcting system and a method thereof, and more particularly to a pointing error correcting system and a method thereof applied for a concentrated photovoltaic or solar heat energy system.

BACKGROUND OF THE INVENTION

Currently, a concentrated photovoltaic (CPV) sun tracking system requires high accuracy sun tracking. If the sun tracking angle deviates slightly, the output power drops abruptly. There are three following main control modes for current dual-axis sun trackers:

1. A closed loop dual-axis sun tracker uses a light sensor to track the sun's position and outputs signals to drive an azimuth motor and an elevation motor so as to achieve the function of tracking the sun. However, its tracking accuracy is affected by the sensitivity of the light sensor and the weather.

2. An open loop dual-axis sun tracker calculates the position of the sun and outputs theoretical value signals obtained from the calculation results to drive an azimuth motor and an elevation motor so as to achieve the function of tracking the sun. However, its tracking accuracy is affected by calculation formulae, assembly errors of the tracker and motor control, etc.

3. A hybrid mode dual-axis sun tracker uses a light sensor to track the sun's position. When in bad weather, the sun tracker is switched to the open loop mode, or tracks over a wide range in the open loop mode and then tracks over a narrow range in the closed loop mode.

The first and third modes require the use of a light sensor. Although they can achieve high accuracy sun tracking, the weather, the stained or damaged surface, or the like can easily cause deviation in tracking the sun. The open loop dual-axis sun tracker does not require the use of a light sensor and can stably track the sun without the influence of the external environment. However, other factors such as assembly errors generated when the tracker is assembled and mounted, deflection of incident sunlight into the atmosphere or accuracy of the sun position calculation program can cause deviation in tracking the sun.

Current celestial body trackers (e.g., astronomical telescopes, sun trackers) have pointing deviation problems similar to those described above. A current solution applied to astronomical telescopes uses a pointing error model to perform pointing correction. However, similar pointing correction technology is infrequent in sun trackers so that sun-tracking accuracy of open loop systems is poor.

An error model is a mathematical expression that simulates pointing deviation, whereby pointing deviation data is analyzed to obtain various pointing deviation factors of a tracker and to further correct the pointing deviation accordingly. The current error model applied to astronomical telescopes is proposed by Stumpff (1972) and Ulich (1981). The correcting method of the proposed model for an example is briefly described as follows:

$$\Delta A = IA + CA \sec(E) + NPAE \tan(E) + AN \tan(E)\sin(A) - AW \tan(E)\cos(A) + A_{obs} \sec(E) \quad (1)$$

$$\Delta E = IE + ECEC \cos(E) + AN \cos(A) + AW \sin(A) + E_{obs} + R(P_s, T_s, RH, E) \quad (2)$$

where A is the azimuth, E is the elevation, in the phase of pointing error data collection, $\Delta A$ represents the azimuth deviation, $\Delta E$ represents the elevation deviation, but in the phase of pointing correction, $\Delta A$ represents the azimuth correction command, $\Delta E$ represents the elevation correction command, which are combined with the azimuth A and the elevation E to form correction commands $A'=A+\Delta A$ and $E'=E+\Delta E$, which are inputted into the tracker to correct the original pointing deviation.

Each coefficient in the above-mentioned pointing error model represents as follows:

IA: the azimuth axis zero offset;
IE: the elevation axis zero offset;
AN: the azimuth axis offset/misalignment north-south;
AW: the azimuth axis offset/misalignment east-west;
NPAE: Non-perpendicularity between the mount azimuth and elevation axes;
CA: the collimation error of the optical element;
ECEC: the gravitational flexure correction at the horizon;
$R(P_s, T_s, RH, E)$: the atmospheric refraction correction ($P_s$ is the barometric pressure, $T_s$ is the temperature, and RH is the relative humidity);
$A_{obs}$: the observer-applied azimuth correction; and
$E_{obs}$: the observer-applied elevation correction.

The correcting procedure using the conventional pointing error model comprises the following steps: observing the structure of a tracker, establishing the corresponding pointing error model through mathematical derivation; measuring pointing deviation data of the celestial body tracker, combining the azimuth A and the elevation E with the azimuth deviation $\Delta A$, and the elevation deviation $\Delta E$ measured at the same time as a data set, wherein the number of data sets must be greater than the number of error model coefficients; inputting the data sets into the pointing error model analysis program, performing curve fitting analysis by using the QR decomposition method to obtain the pointing error model coefficients; inputting the pointing error model coefficients into the pointing control program of the tracker to complete pointing correction.

However, for the simplification of algorithmic requirements, the conventional error model assumes that all the deviations and the azimuth deviations and elevation deviations resulted from various error factors are small angles (<2°). Therefore, a small angle approximation method (for example, $\sin \theta \sim \theta$) can be employed to simplify the mathematical derivation procedures, but it also limits the pointing deviation correction function of the pointing error model. For example, at summer noon in Taiwan, the position of the sun is very close to the pole of horizontal celestial coordinate system (zenith, at an elevation of 90°). Therefore, as shown in FIG. 1, the tracker cannot accurately point toward the sun after corrected by the pointing error model (S indicates the path of the sun, E indicates the path before the tracker is corrected, and C indicates the path after the tracker is corrected). Nonetheless, summer is the season of the maximum sunshine amount in a whole year, so an attempt should be made to analyze and solve such problem. In addition, the actual pointing deviation near the pole is far less than the azimuth deviation, but the special characteristics of azimuth dimensions in a horizontal celestial coordinate system are that all of them converge at the zenith to form the pole of the coordinate system. Namely, the azimuth values vary severely near the pole. Therefore, even if the pointing deviation is small, a very large azimuth deviation will be resulted from the characteristics of such coordinate system.

U.S. Pat. No. 6,704,607 discloses a pointing error correcting method for an open loop sun tracking system using an error model. The error model coefficients are coupled with each other, so these error model coefficients representing various errors must be solved in a predetermined order. The deviation data inputted for error model analysis must have azimuthal symmetry to satisfy the assumption in the derivation of this error model. When a new error factor of the tracker is found through the observation of the deviation data, it is necessary to derive various error model functions again. This method is more limited and more complicated.

SUMMARY OF THE INVENTION

In view of the above-mentioned problems of the prior art, an object of the present invention is to provide a pointing error correcting system and a method thereof, which solve the problem that the tracker cannot accurately point the sun after a concentrated photovoltaic sun tracking system is corrected by a pointing error model.

According to the object of the present invention, there is provided a pointing error correcting system comprising a tracker, a driving module, a measuring module and a processing module. The tracker tracks a celestial body (the celestial body is the sun). The driving module is connected to and drives the tracker. The measuring module is connected to the tracker and measures a tracking deviation of the tracker. The processing module is connected to the driving module and the measuring module, calculates a position of the celestial body, controls the driving module according to the position of the celestial body to drive the tracker pointing the celestial body, calculates an error value between the pointing of the tracker and the celestial body measured by the measuring module through a coordinate transforming method, and corrects the driving module according to the error value to drive the tracker pointing the celestial body.

According to the object of the present invention, there is provided a pointing error correcting method applied for a concentrated photovoltaic or solar heat energy system comprising a processing module, a driving module, a tracker and a measuring module. The method comprises the following steps: calculating a position of a celestial body via the processing module, controlling the driving module according to the position of the celestial body via the processing module to drive the tracker pointing the celestial body, calculating an error value between the pointing of the tracker and the celestial body measured by the measuring module through a coordinate transforming unit, and correcting the driving module according to the error value to drive the tracker pointing the celestial body.

As described above, the pointing error correcting system and the method thereof according to the present invention may have the following advantage:

The pointing error correcting system and the method thereof can improve the accuracy of a pointing error correcting model in tracking the sun during the summer.

DETAILED DESCRIPTION OF THE PREFERRED EMBODIMENTS

Figure 1:
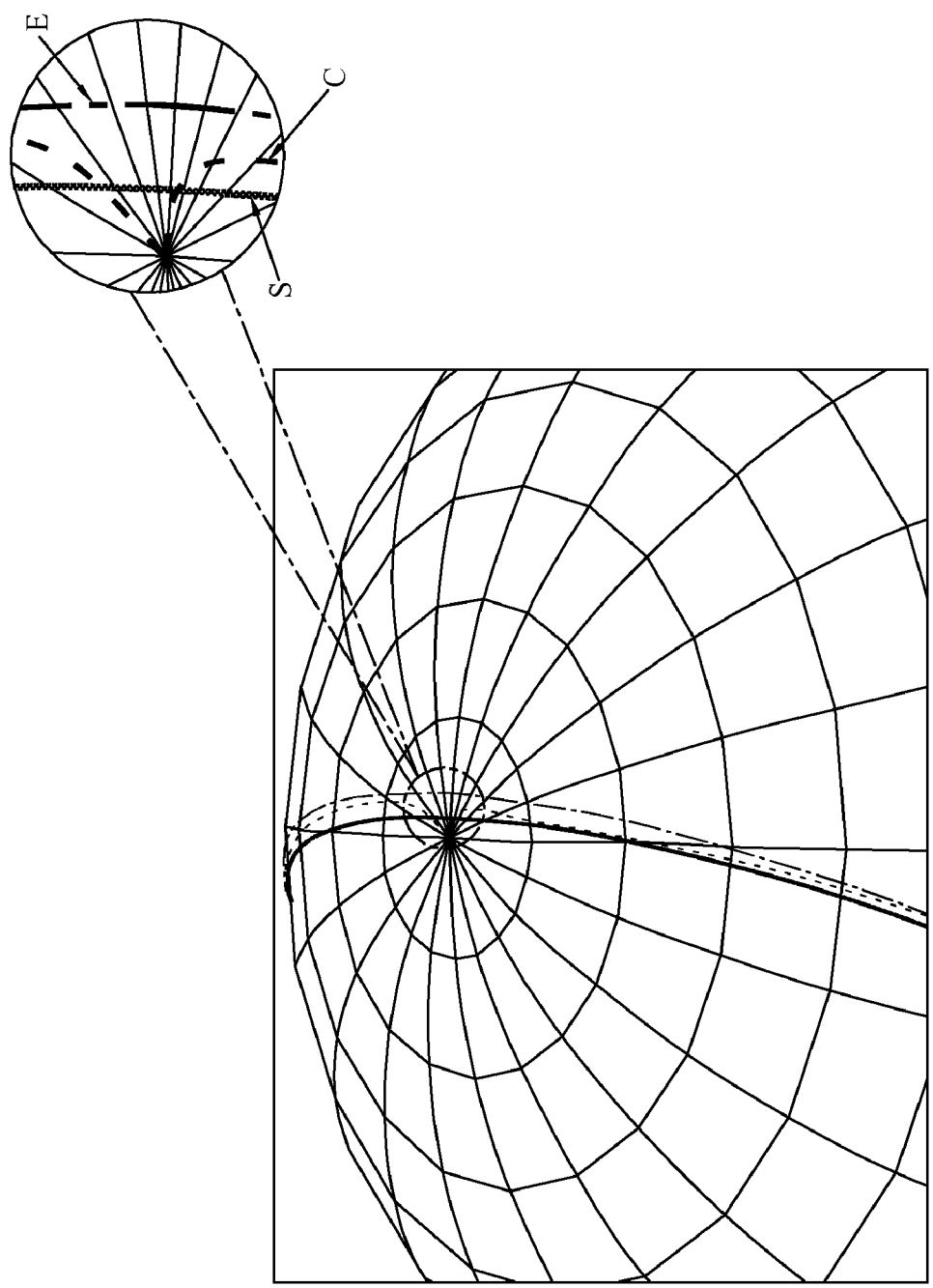
FIG. 1 is a schematic view showing the result of pointing error correction of the prior art.
Figure 2:
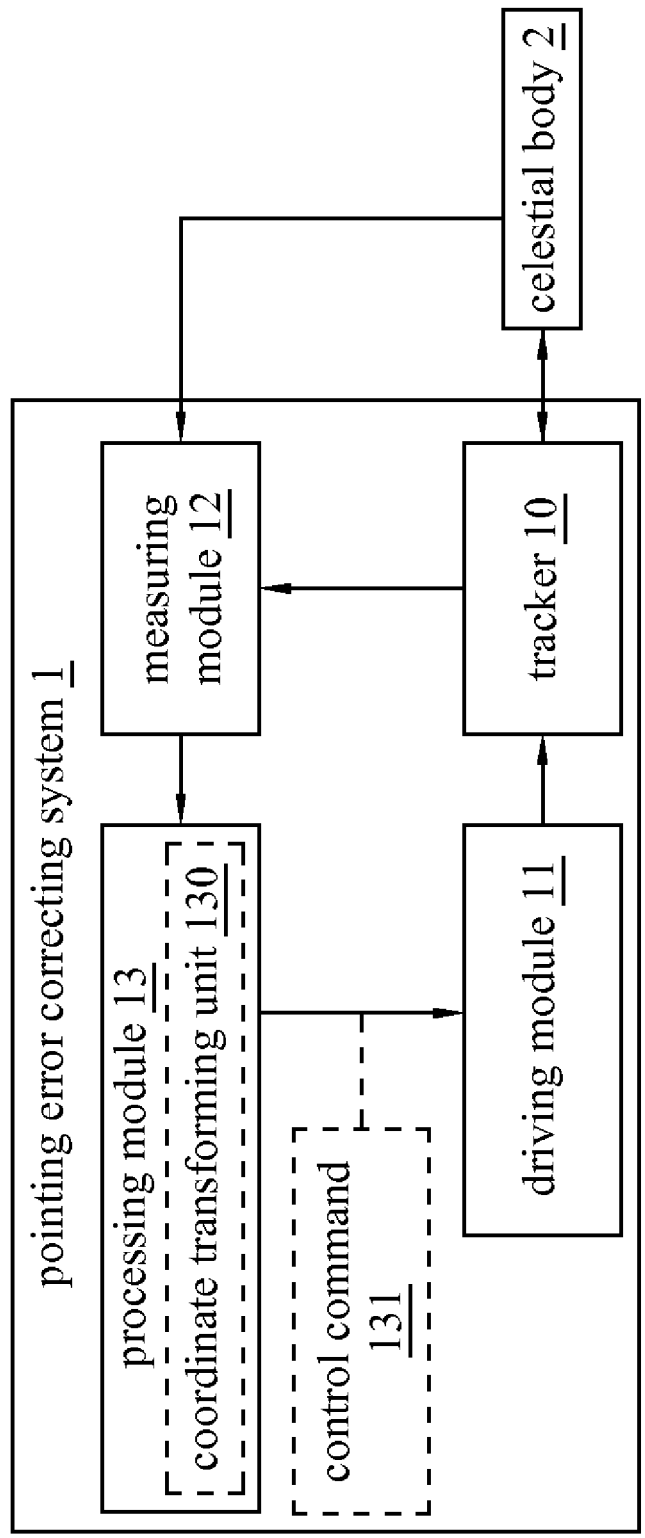
FIG. 2 is a block diagram of a pointing error correcting system according to the present invention.

Referring to FIG. 2, there is shown a block diagram of a pointing error correcting system according to the present invention. As shown in this figure, the pointing error correcting system 1 comprises a tracker 10, a driving module 11, a measuring module 12 and a processing module 13. The tracker 10 tracks a celestial body 2 (the celestial body 2 is the sun). The driving module 11 is connected to and drives the tracker 10. The measuring module 12 is connected to the tracker 10 and measures a tracking deviation of the tracker 10. The processing module 13 is connected to the driving module 11 and the measuring module 12, calculates a position of the celestial body 2, controls the driving module 11 according to the position of the celestial body 2 to drive the tracker 10 pointing the celestial body 2, calculates an error value between the tracker 10 and the celestial body 2 measured by the measuring module 12 via a coordinate transforming unit 130 to form a control command 131, and corrects the driving module 11 according to the control command 131 to drive the tracker 10 pointing the celestial body 2.

Figure 3:
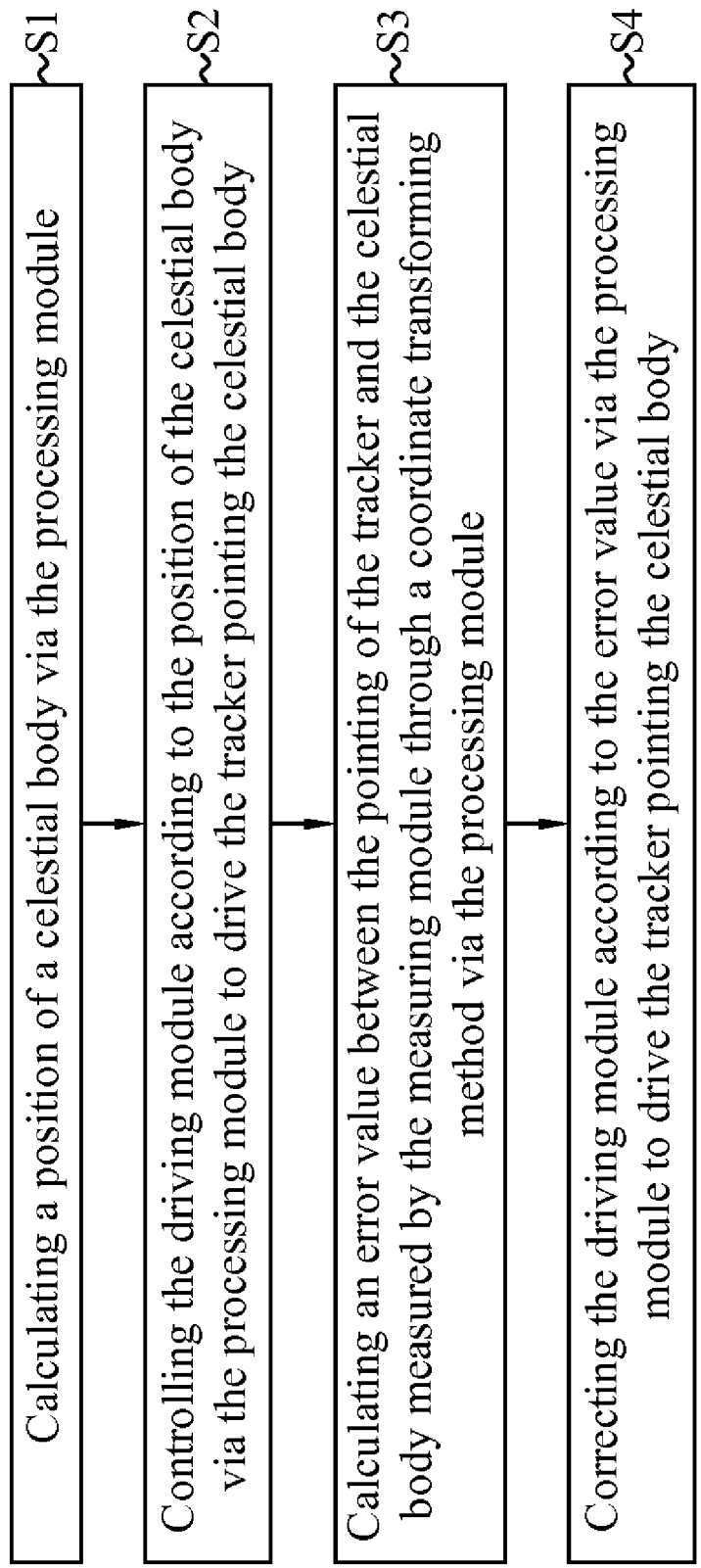
FIG. 3 is a flow chart showing a pointing error correcting method according to the present invention.

Referring to FIG. 3, there is shown a flow chart showing a pointing error correcting method according to the present invention. As shown in this figure, the present method comprises the following steps: (S1) calculating a position of a celestial body via the processing module; (S2) controlling the driving module according to the position of the celestial body via the processing module to drive the tracker pointing the celestial body; (S3) calculating an error value between the pointing of the tracker and the celestial body measured by the measuring module through a coordinate transforming method via the processing module to form a control command, and (S4) correcting the driving module according to the control command via the processing module to drive the tracker pointing the celestial body.

Calculating the position of the celestial body via the processing module is calculating a first azimuth value and a first elevation value of the celestial body according to a time value via the processing module. The processing module controls the driving module according to the first azimuth value and the first elevation value to drive the tracker pointing the celestial body.

Figure 4:
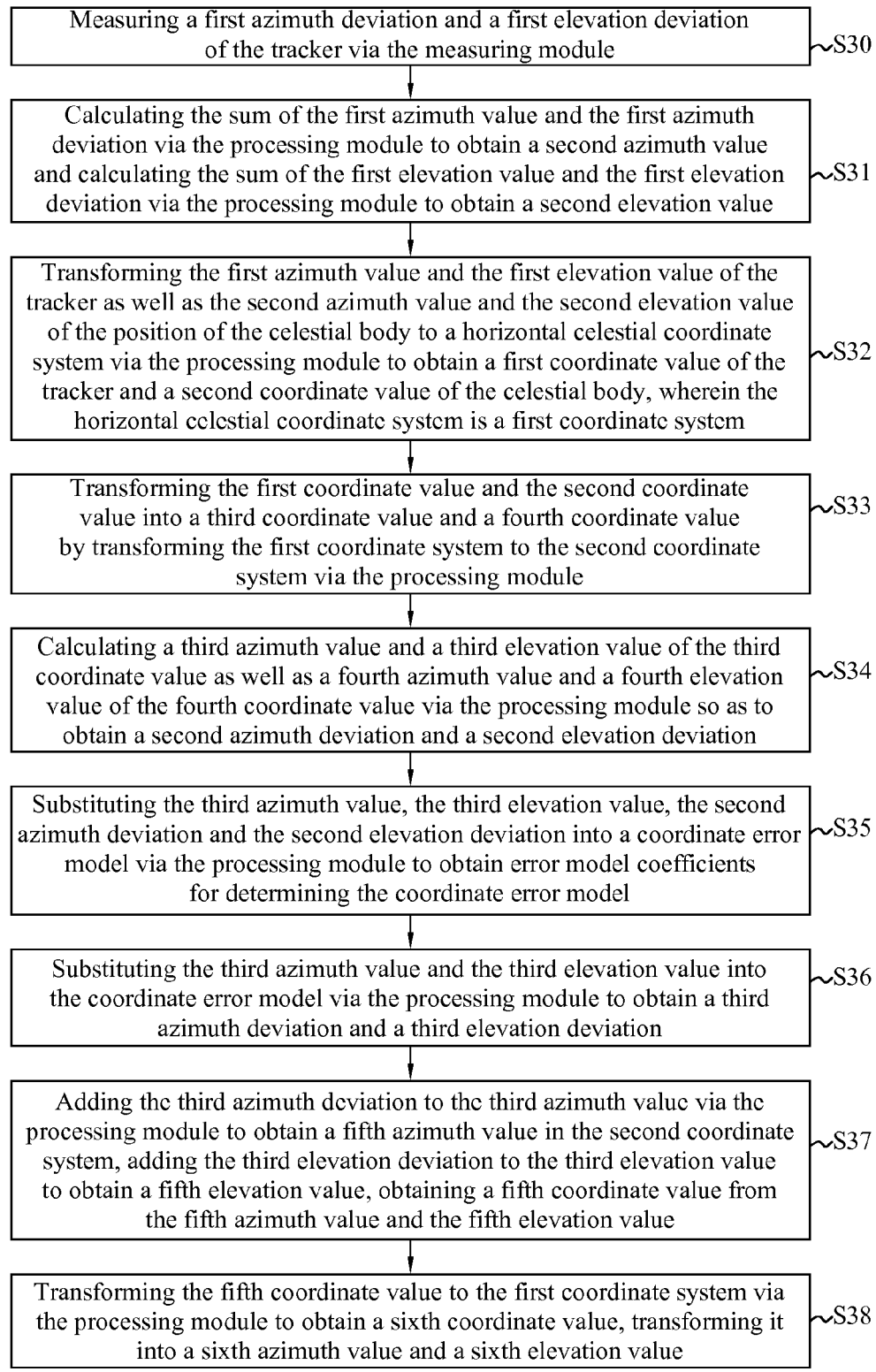
FIG. 4 is a flow chart showing calculating procedures for calculating an error value between the pointing of the tracker and the celestial body measured by the measuring module according to the present invention.

Referring to FIG. 4, the step (S3) of calculating the error value between the pointing of the tracker and the celestial body measured by the measuring module via the processing module further comprises the following steps: (S30) measuring a first azimuth deviation and a first elevation deviation of the tracker via the measuring module; (S31) calculating the sum of the first azimuth value and the first azimuth deviation via the processing module to obtain a second azimuth value and calculating the sum of the first elevation value and the first elevation deviation via the processing module to obtain a second elevation value; (S32) transforming the first azimuth value and the first elevation value of the tracker as well as the second azimuth value and the second elevation value of the position of the celestial body to a horizontal celestial coordinate system via the processing module to obtain a first coordinate value of the tracker and a second coordinate value of the celestial body, wherein the horizontal celestial coordinate system is a first coordinate system; (S33) transforming the first coordinate value and the second coordinate value into a third coordinate value and a fourth coordinate value by transforming the first coordinate system to the second coordinate system via the processing module; (S34) calculating a third azimuth value and a third elevation value of the third coordinate value as well as a fourth azimuth value and a fourth elevation value of the fourth coordinate value via the processing module so as to obtain a second azimuth deviation and a second elevation deviation; (S35) substituting the third azimuth value, the third elevation value, the second azimuth deviation and the second elevation deviation into a coordinate error model via the processing module to obtain a plurality of error model coefficients for determining the coordinate error model; (S36) substituting the third azimuth value and the third elevation value into the coordinate error model via the processing module to obtain a third azimuth deviation and a third elevation deviation; (S37) adding the third azimuth deviation to the third azimuth value via the processing module to obtain a fifth azimuth value in the second coordinate system, adding the third elevation deviation to the third elevation value to obtain a fifth elevation value, obtaining a fifth coordinate value from the fifth azimuth value and the fifth elevation value; and (S38) transforming the fifth coordinate value to the first coordinate system via the processing module to obtain a sixth coordinate value, and transforming the sixth coordinate value into a sixth azimuth value and a sixth elevation value.

Then, the processing module forms a control command according to the sixth azimuth value and the sixth elevation value. In step (S4), the processing module corrects and controls the driving module according to the control command to drive the tracker.

In step (S32), the first azimuth value, the first azimuth deviation, the first elevation value and the first elevation deviation, and both of the first coordinate value and the second coordinate value which are transformed to the horizontal celestial coordinate system as the first coordinate system, satisfy the following equations:

the first coordinate value (the tracker):

$i_{T1} = \cos(E)\cos(A)$;

$j_{T1} = -\cos(E)\cos(A)$; and $k_{T1} = \sin(E)$.

the second coordinate value (the position of the celestial body):

$i_{S1} = \cos(E+\Delta E)\cos(A+\Delta A)$;

$j_{S1} = -\cos(E+\Delta E)\cos(A+\Delta A)$; and $k_{S1} = \sin(E+\Delta E)$.

where E is the first elevation value, A is the first azimuth value, $\Delta E$ is the first elevation deviation, and $\Delta A$ is the first azimuth deviation.

Figure 5:
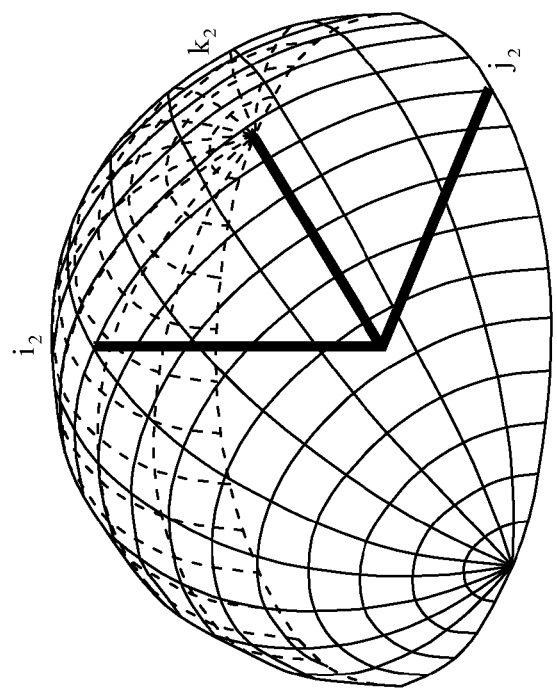
FIG. 5 is a schematic view showing a coordinate transforming method according to the present invention.
Figure 5:
Figure 5:
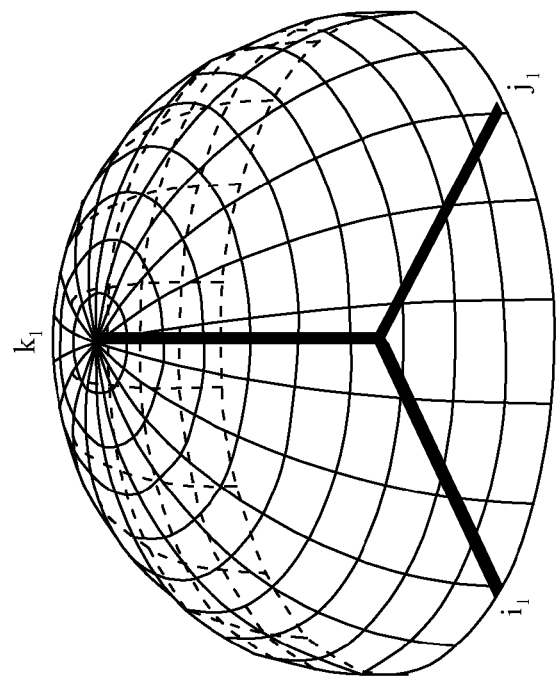

Referring to FIG. 5, in step (S33), the relationship between the first coordinate system $(i_1, j_1, k_1)$ and the second coordinate system $(i_2, j_2, k_2)$ satisfies the following equations:

$i_2 = k_1$;

$j_2 = j_1$; and $k_2 = -i_1$.

In step (S34), the relationships between the third azimuth value and the third elevation value of the third coordinate value $(i_{T2}, j_{T2}, k_{T2})$, the fourth azimuth value and the fourth elevation value of the fourth coordinate value $(i_{S2}, j_{S2}, k_{S2})$, the second azimuth deviation, the second elevation deviation and the first azimuth value, the first azimuth deviation, the first elevation value, the first elevation deviation, the first coordinate value $(i_{T1}, j_{T1}, k_{T1})$, the second coordinate value $(i_{S1}, j_{S1}, k_{S1})$ satisfy the following equations:

the third coordinate value (the tracker):

$\cos(Y)\cos(X) = i_{T2} = k_{T1} = \sin(E)$;

$-\cos(Y)\sin(X) = j_{T2} = j_{T1} = -\cos(E)\sin(A)$; and $\sin(Y) = k_{T2} = -i_{T1} = -\cos(E)\cos(A)$.

the fourth coordinate value (the position of the celestial body):

$\cos(Y+\Delta Y)\cos(X+\Delta X) = i_{S2} = k_{S1} = \sin(E+\Delta E)$;

$-\cos(Y+\Delta Y)\sin(X+\Delta X) = j_{S2} = j_{S1} = -\cos(E+\Delta E)\sin(A+\Delta A)$; and $\sin(Y+\Delta Y) = k_{S2} = -i_{S1} = -\cos(E+\Delta E)\cos(A+\Delta A)$.

where Y is the third elevation value, X is the third azimuth value, $\Delta Y$ is the second elevation deviation, $\Delta X$ is the second azimuth deviation, $Y+\Delta Y$ is the fourth elevation value, and $X+\Delta X$ is the fourth azimuth value. The above-mentioned coordinate transformation is the coordinate transforming method performed by the coordinate transforming unit of the present invention.

In step (S35), the processing module substitutes the third azimuth value, the third elevation value, the second azimuth deviation and the second elevation deviation into a coordinate error model to obtain a plurality of error model coefficients for determining the coordinate error model. The coordinate error model is represented as follows:

$$\Delta X = IA\tan Y\cos X + AN\tan Y\sin X - AW - \frac{(ECEC\sin X \sec Y + [-IE(\sin Y\tan Y\sin X + \cos Y\sin X) + NPAE\sin Y\cos^2 X + CA\tan Y\cos X])}{(\sqrt{1-\cos^2 Y\cos^2 X})}$$

$$\Delta Y = -IA\sin X + AN\cos X - ECEC\sin Y\cos X - \frac{(IE\sin Y\cos X + NPAE\cos Y\sin X\cos X + CA\sin X)}{\sqrt{1-\cos^2 Y\cos^2 X}}$$

Each coefficient in the above-mentioned coordinate error model represents as follows:

IA: the azimuth axis zero offset;
IE: the elevation axis zero offset;
AN: the azimuth axis offset/misalignment north-south;
AW: the azimuth axis offset/misalignment east-west;
NPAE: Non-perpendicularity between the mount azimuth and elevation axes;
CA: the collimation error of the optical element; and
ECEC: the gravitational flexure correction at the horizon.

When the error model coefficients are determined, an elevation deviation or an azimuth deviation (i.e. a third elevation deviation and a third azimuth deviation) can be determined by the coordinate error model followed by steps (S36) to (S38) to form a control command which can controls the driving module to correct the elevation or the azimuth of the tracker in step (S4).

In actual embodiments, multiple pointings of the tracker and positions of the sun are extracted to form a data set as listed in the following table.

| solar azimuth A (deg) | −111.17 | −110.90 | ... | 111.73 |
|---|---|---|---|---|
| solar elevation E (deg) | 10.40 | 11.03 | ... | 9.13 |
| azimuth deviation $\Delta A$ (deg) | −3.33 | −3.35 | ... | −2.39 |
| elevation deviation $\Delta E$ (deg) | −3.89 | −3.88 | ... | 1.66 |

In the phase of data collection, the number of data sets must be far greater than the number of error model coefficients. Namely, the number of equations is far greater than the number of unknowns. This case is referred to as an overdetermined case. When an overdetermined case occurs, the most suitable coefficients for the coordinate error model can be found out using QR decomposition.

Figure 6:
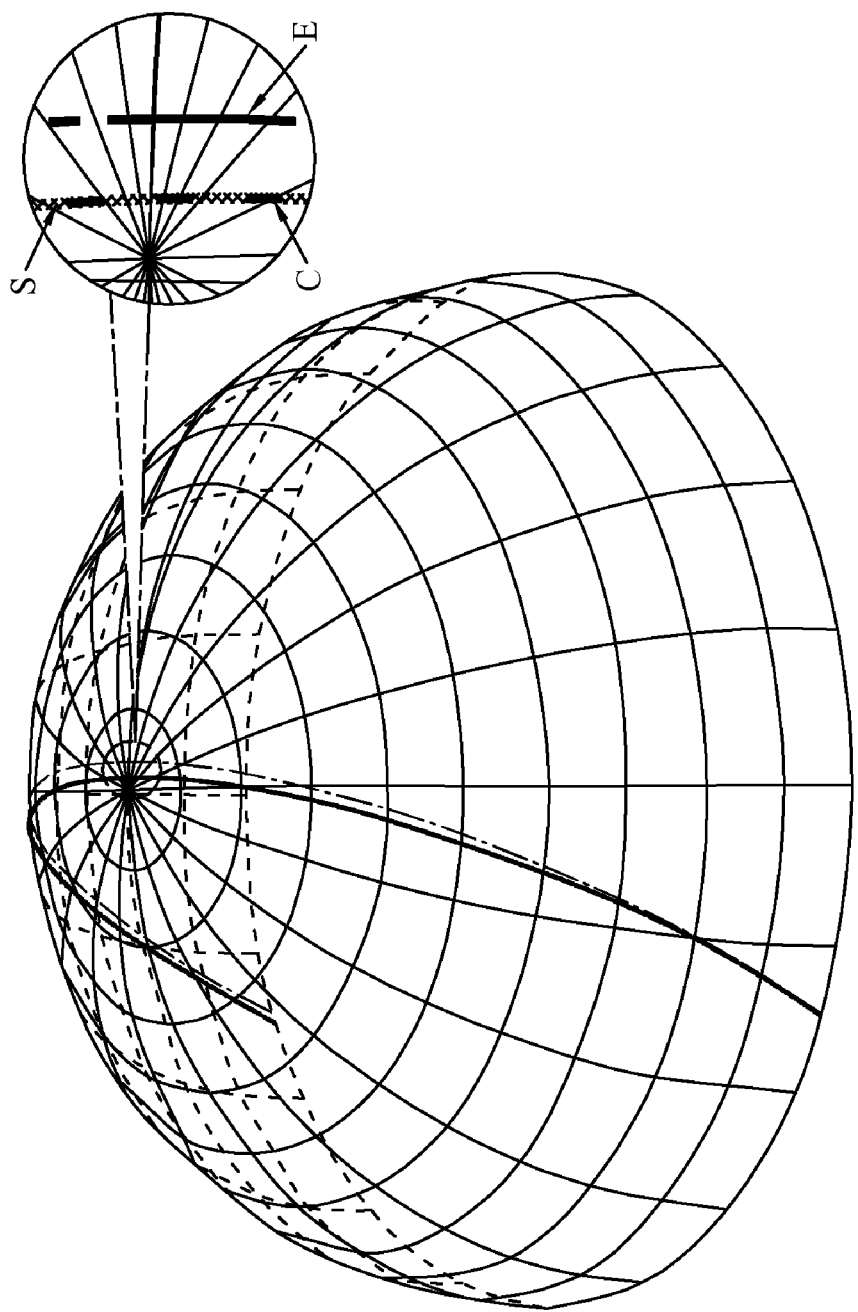
FIG. 6 is a schematic view showing a correction result of a pointing error correcting method according to the present invention during the summer.
Figure 7:
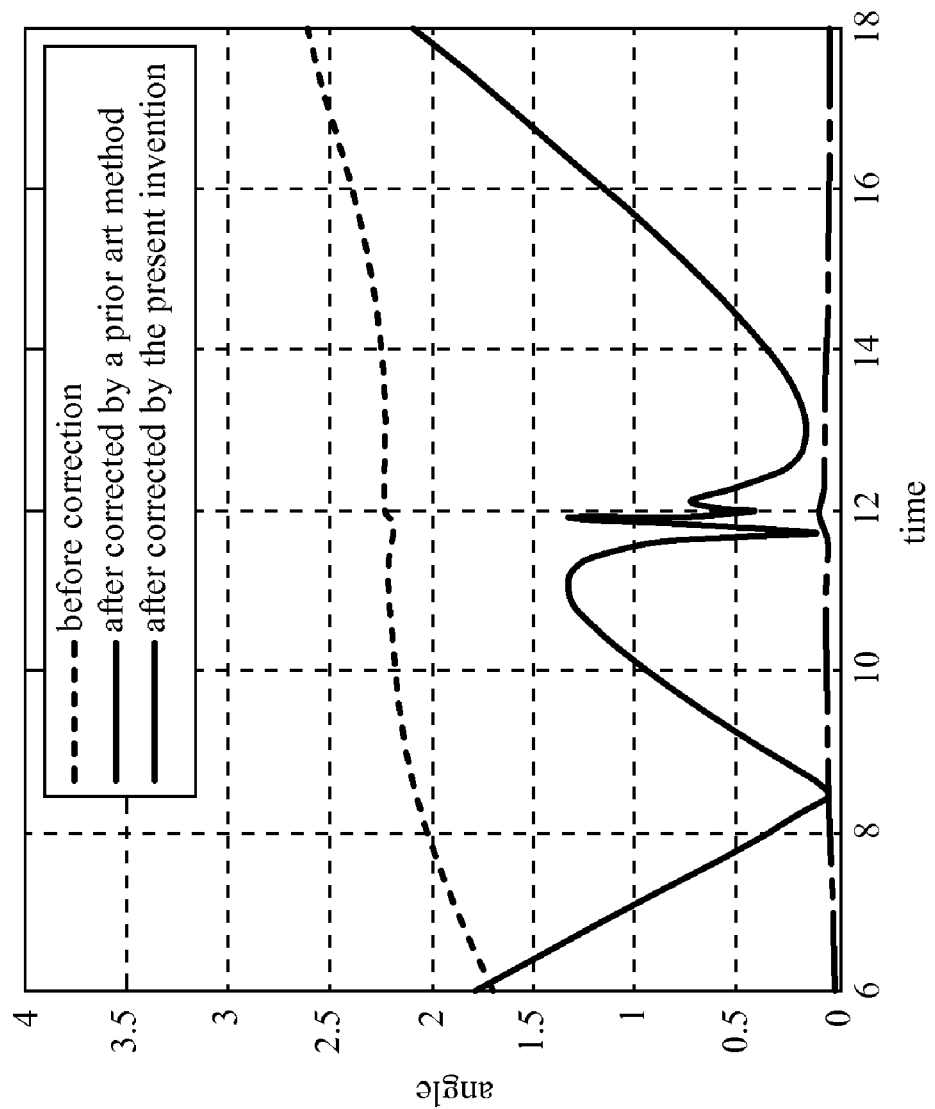
FIG. 7 is a graph showing the comparison between a pointing error correcting method according to the present invention and an uncorrected result and a correcting method of the prior art.

Referring to FIGS. 6 and 7, there are shown schematic views showing correction results of a pointing error correcting method according to the present invention. As shown in FIG. 6, the pointing error correcting method of the present invention performs better during the summer. As shown in FIG. 7, the comparison between tracking deviation angles before corrected by a pointing error model, after corrected by a pointing error model of the prior art, and after corrected by a pointing error model of the present invention indicates that the present invention can significantly reduce the deviation angle for tracking of the sun down to 0.12°.

Figure 8:
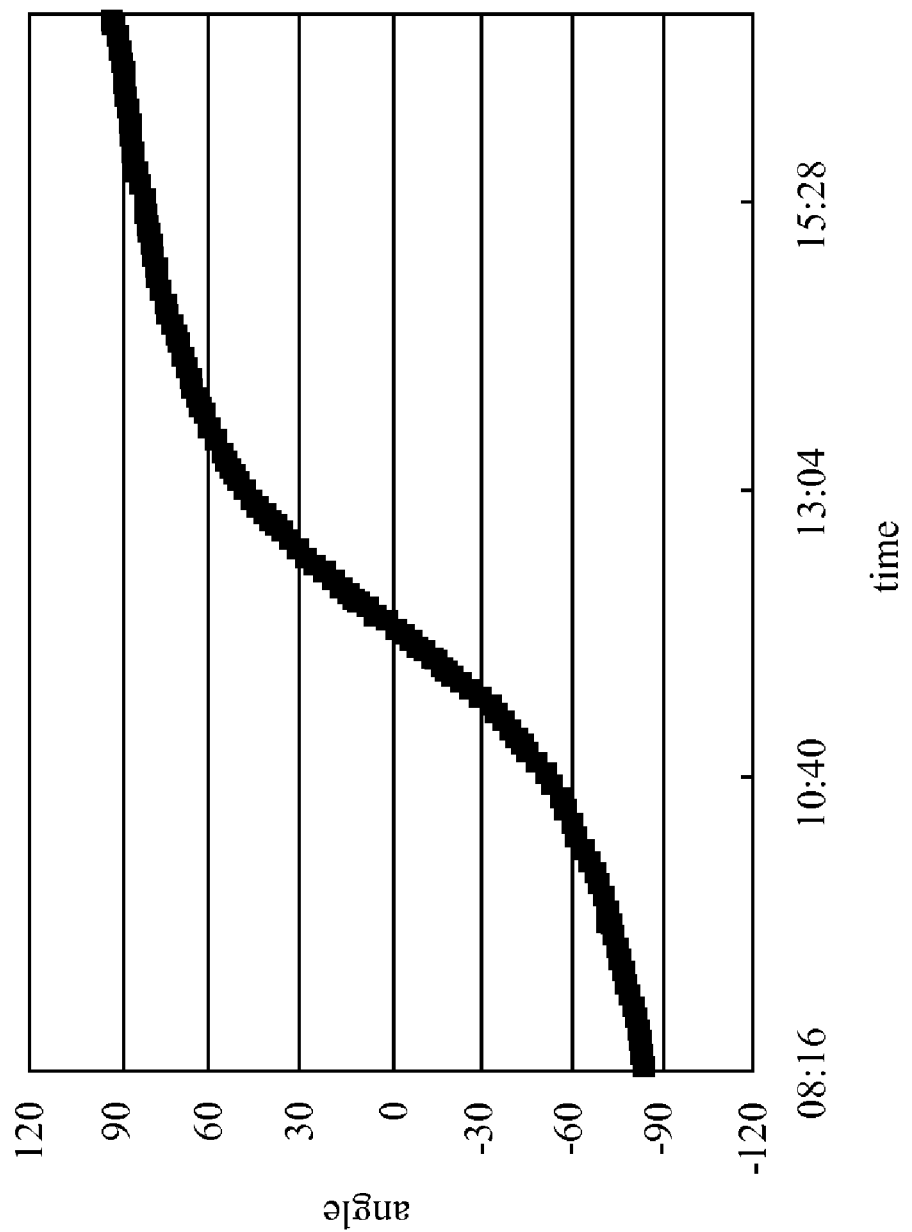
FIG. 8 is an observation view of solar azimuths according to the present invention.
Figure 9:
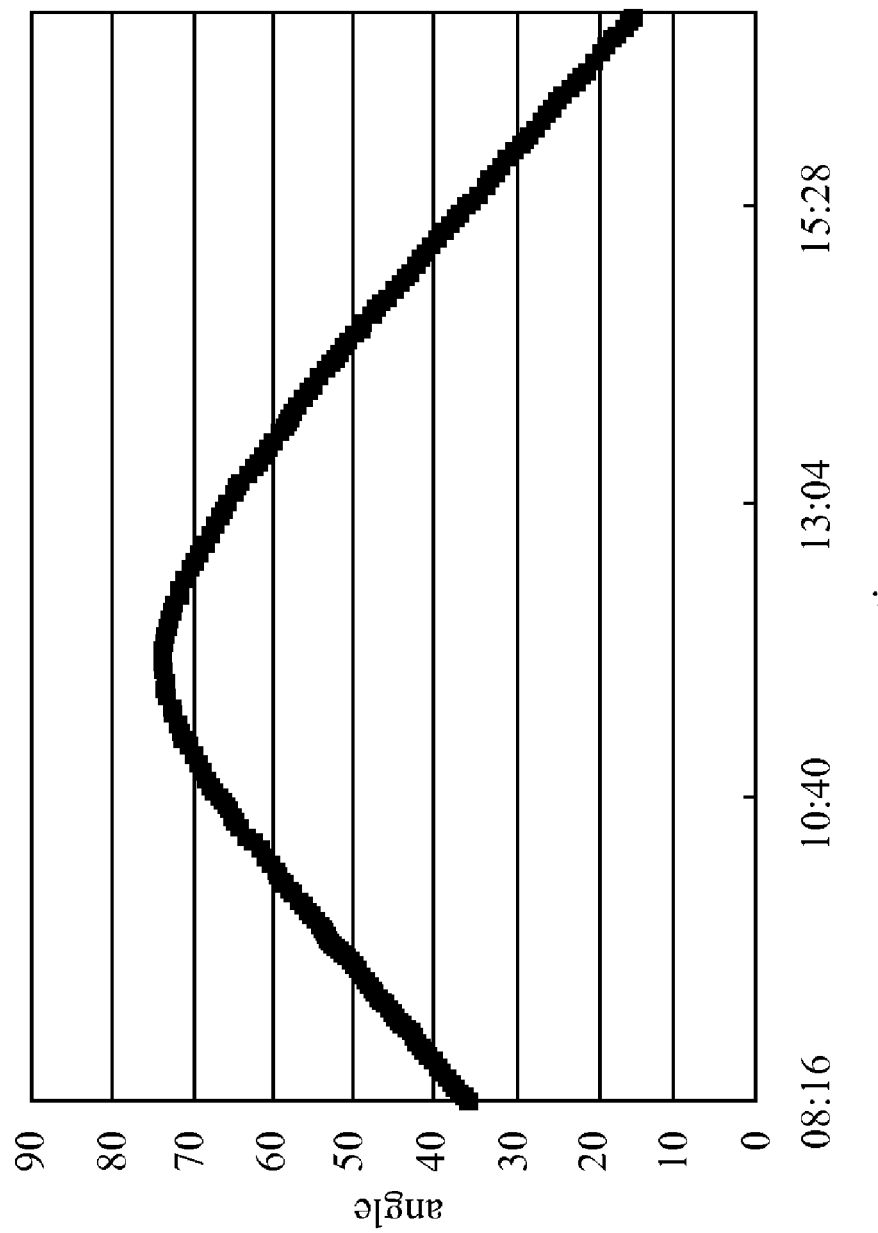
FIG. 9 is an observation view of solar elevations according to the present invention.
Figure 10:
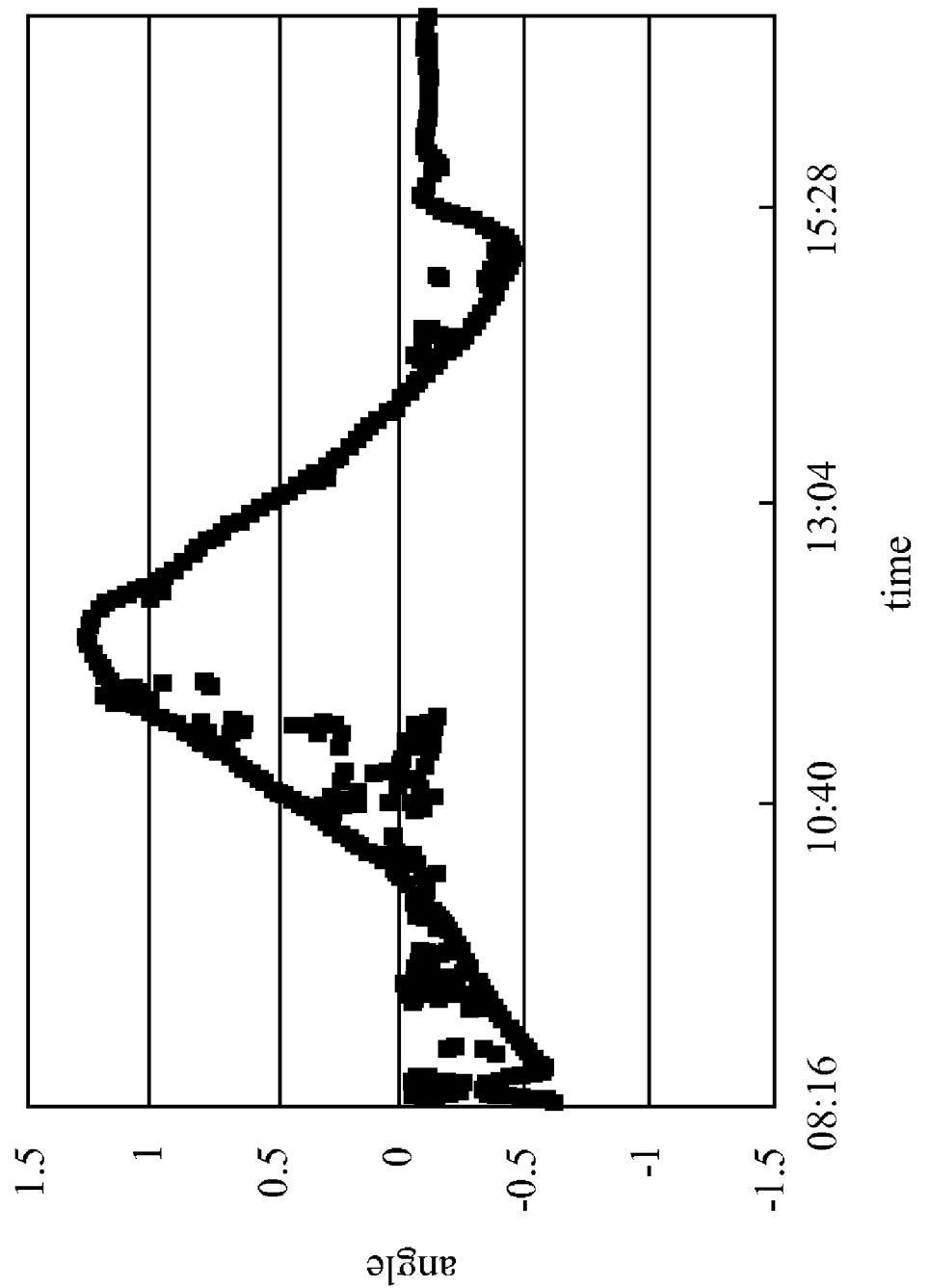
FIG. 10 is a schematic view showing azimuth deviation of a tracker according to the present invention.
Figure 11:
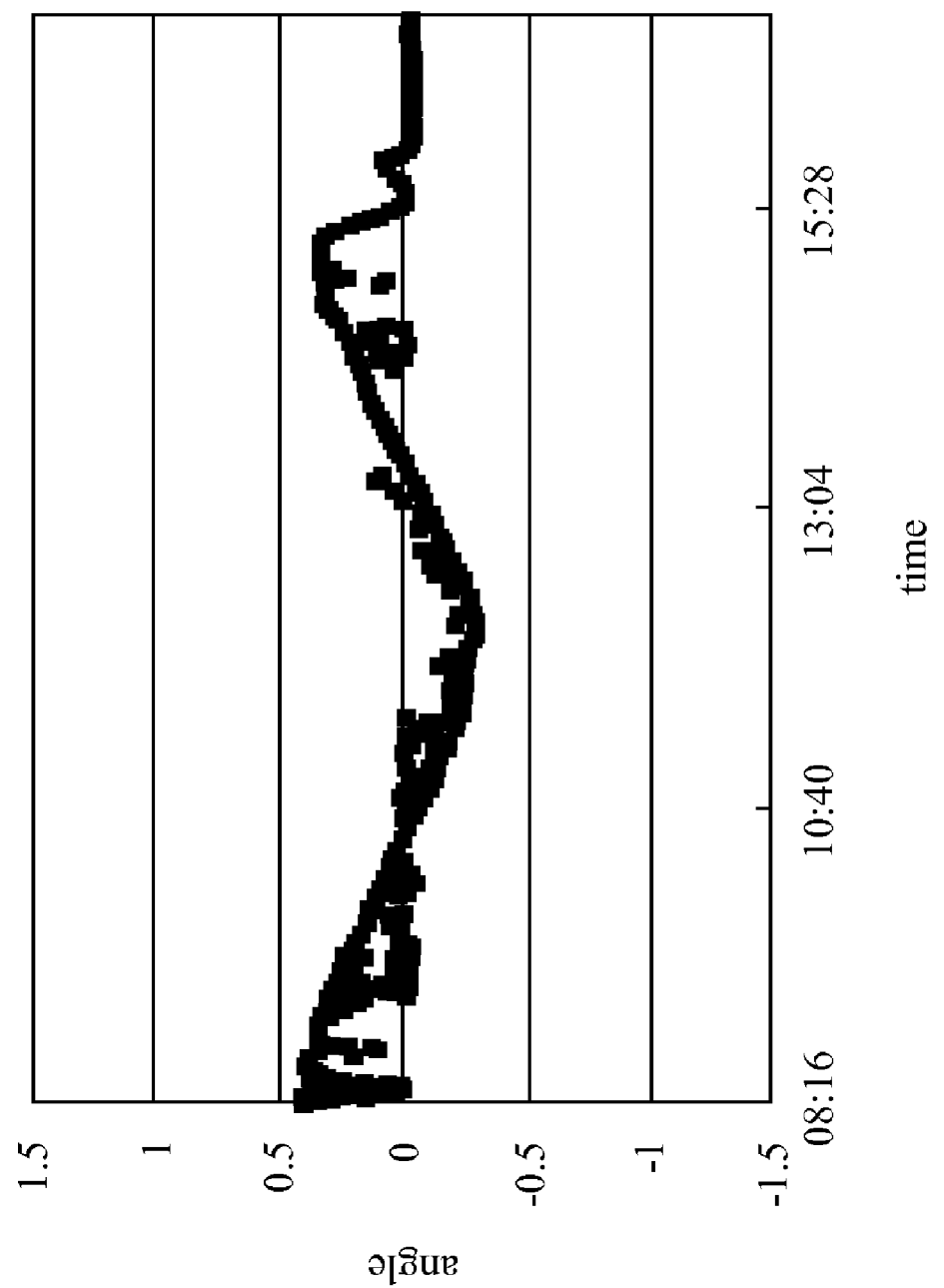
FIG. 11 is a schematic view showing elevation deviation of a tracker according to the present invention.
Figure 12:
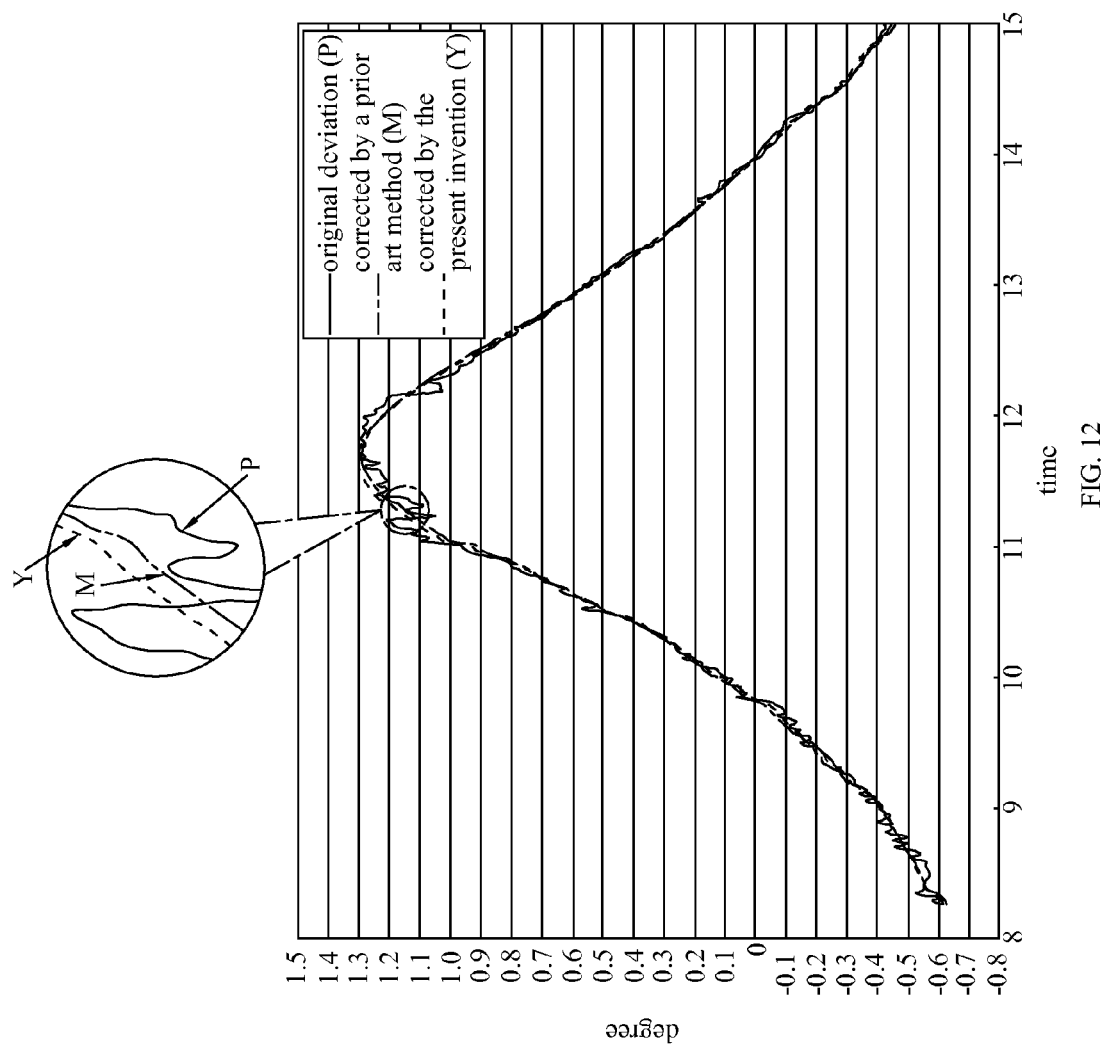
FIG. 12 is a schematic view showing azimuth angle curve fitting of a pointing error correcting method according to the present invention.
Figure 13:
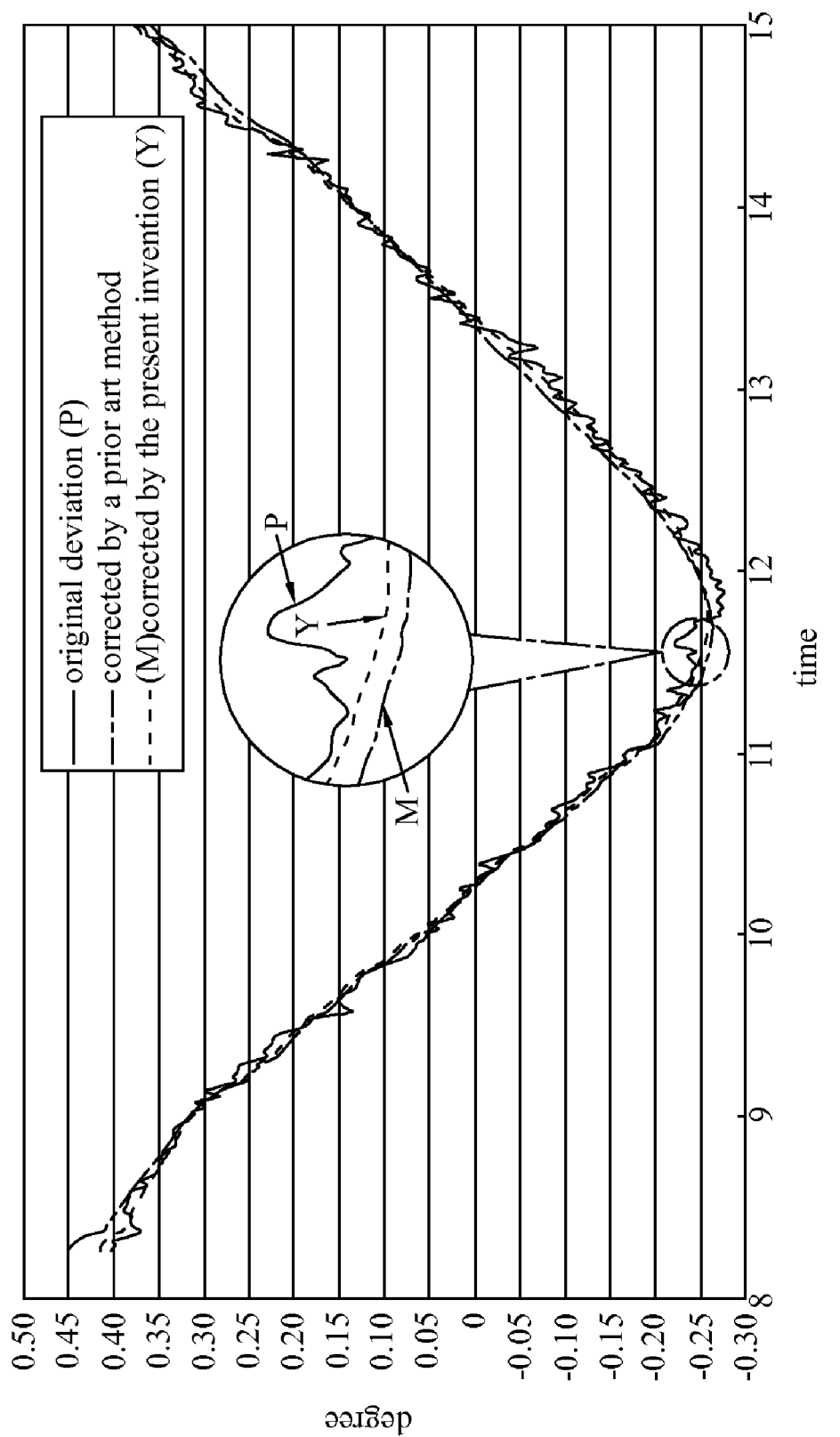
FIG. 13 is a schematic view showing elevation angle curve fitting of a pointing error correcting method according to the present invention.

Moreover, referring to FIGS. 8 through 13, there are shown schematic views showing correction results of a pointing error correcting method according to the present invention. During the experimental period from 8:00 to 15:00, the processing module uses a sun position algorithm as a core to calculate an azimuth A (a first azimuth value) and an elevation E (a first elevation value) of the sun in real time, as shown in FIGS. 8 and 9, which are used as commands to drive the tracker. The measuring module is a position sensitive device (PSD). Azimuth deviation $\Delta A$ (a first azimuth deviation) and elevation deviation $\Delta E$ (a first elevation deviation) of the tracker when tracking the sun are obtained by analyzing the measured data, as shown in FIGS. 10 and 11. It can be found from FIGS. 10 and 11 that there are some fluctuations in the deviation angles during some periods in the case where the PSD cannot operate normally because the sunlight is shielded by clouds. Since the clouds are too thick after 15:03, the PSD cannot detect the positions of the sun and therefore anomalous and erroneous data of the deviation angles of almost zero appears. The data sets in which anomalous data is removed are inputted into the error model to obtain error model coefficients and to observe the deviation curve fitting. As shown in FIGS. 12 and 13, P curve represents measured data from the PSD 8/30, M curve shows an analysis result obtained from the pointing error model of the prior art, and Y curve shows an analysis result obtained when the new coordinate pointing error model is used. The results show good curve fitting.

The pointing error correcting system and the method thereof according to the present invention can improve the accuracy of a pointing error correcting model in tracking the sun during the summer through a coordinate transforming method and can further increase the output power of a concentrated photovoltaic sun tracking system.

The above description is illustrative only and is not to be considered limiting. Various modifications or changes can be made without departing from the spirit and scope of the invention. All such equivalent modifications and changes shall be included within the scope of the appended claims.

What is claimed is:

1. A pointing error correcting method applied for a concentrated photovoltaic or solar heat energy system comprising a processing module, a driving module, a tracker and a measuring module, the pointing error correcting method comprising the following steps:
    calculating a position of a celestial body via the processing module;
    controlling the driving module according to the position of the celestial body via the processing module to drive the tracker pointing the celestial body;
    calculating an error value between the pointing of the tracker and the celestial body measured by the measuring module through a coordinate transforming method via the processing module to form a control command; and
    correcting the driving module according to the control command via the processing module to drive the tracker pointing the celestial body.

2. The pointing error correcting method as set forth in claim 1, wherein calculating the position of the celestial body via the processing module is calculating a first azimuth value and a first elevation value of the celestial body according to a time value via the processing module.

3. The pointing error correcting method as set forth in claim 2, wherein the step of controlling the driving module according to the position of the celestial body via the processing module to drive the tracker pointing the celestial body is controlling the driving module according to the first azimuth value and the first elevation value via the processing module to drive the tracker pointing the celestial body.

4. The pointing error correcting method as set forth in claim 3, wherein the step of calculating the error value between the pointing of the tracker and the celestial body measured by the measuring module via the processing module further comprises the following steps:

measuring a first azimuth deviation and a first elevation deviation of the tracker via the measuring module;

calculating the sum of the first azimuth value and the first azimuth deviation via the processing module to obtain a second azimuth value and calculating the sum of the first elevation value and the first elevation deviation via the processing module to obtain a second elevation value; and transforming the first azimuth value and the first elevation value as well as the second azimuth value and the second elevation value to a horizontal celestial coordinate system via the processing module to obtain a first coordinate value of the tracker and a second coordinate value of the celestial body, wherein the horizontal celestial coordinate system is a first coordinate system.

5. The pointing error correcting method as set forth in claim 4, wherein the step of calculating the error value between the pointing of the tracker and the celestial body measured by the measuring module via the processing module further comprises the following steps:

transforming the first coordinate value and the second coordinate value into a third coordinate value and a fourth coordinate value by transforming the first coordinate system to the second coordinate system via the processing module;

calculating a third azimuth value and a third elevation value of the third coordinate value as well as a fourth azimuth value and a fourth elevation value of the fourth coordinate value via the processing module so as to obtain a second azimuth deviation and a second elevation deviation; and substituting the third azimuth value, the third elevation value, the second azimuth deviation and the second elevation deviation into a coordinate error model via the processing module to obtain a plurality of error model coefficients for determining the coordinate error model.

6. The pointing error correcting method as set forth in claim 5, wherein calculating the error value between the pointing of the tracker and the celestial body measured by the measuring module via the processing module further comprises the following steps:

substituting the third azimuth value and the third elevation value into the coordinate error model via the processing module to obtain a third azimuth deviation and a third elevation deviation;

adding the third azimuth deviation to the third azimuth value via the processing module to obtain a fifth azimuth value in the second coordinate system, adding the third elevation deviation to the third elevation value to obtain a fifth elevation value, obtaining a fifth coordinate value from the fifth azimuth value and the fifth elevation value; and transforming the fifth coordinate value to the first coordinate system via the processing module to obtain a sixth coordinate value, transforming the sixth coordinate value into a sixth azimuth value and a sixth elevation value.

7. The pointing error correcting method as set forth in claim 6, wherein correcting the driving module according to the control command via the processing module to drive the tracker pointing the celestial body is controlling the driving module according to the control command formed by the sixth azimuth value and the sixth elevation value via the processing module to drive the tracker.

8. A pointing error correcting system applied for a concentrated photovoltaic or solar heat energy system, the pointing error correcting system comprising:

a tracker for tracking a celestial body;

a driving module connected to and driving the tracker;

a measuring module connected to the tracker and measuring the action of the tracker; and a processing module connected to the driving module and the measuring module, calculating a position of the celestial body, controlling the driving module according to the position of the celestial body to drive the tracker pointing the celestial body, calculating an error value between the pointing of the tracker and the celestial body measured by the measuring module via a coordinate transforming unit to form a control command, and correcting the driving module according to the control command to drive the tracker pointing the celestial body.

9. The pointing error correcting system as set forth in claim 8, wherein the processing module calculates a first azimuth value and a first elevation value of the celestial body according to a time value.

10. The pointing error correcting system as set forth in claim 9, wherein the processing module controls the driving module according to the first azimuth value and the first elevation value to drive the tracker pointing the celestial body.

11. The pointing error correcting system as set forth in claim 10, wherein the measuring module measures a first azimuth deviation and a first elevation deviation of the tracker.

12. The pointing error correcting system as set forth in claim 11, wherein the processing module calculates the sum of the first azimuth value and the first azimuth deviation to obtain a second azimuth value, calculates the sum of the first elevation value and the first elevation deviation to obtain a second elevation value, and transforms the first azimuth value and the first elevation value as well as the second azimuth value and the second elevation value to a horizontal celestial coordinate system to obtain a first coordinate value of the tracker and a second coordinate value of the celestial body, and wherein the horizontal celestial coordinate system is a first coordinate system.

13. The pointing error correcting system as set forth in claim 12, wherein the processing module transforms the first coordinate value and the second coordinate value into a third coordinate value and a fourth coordinate value by transforming the first coordinate system to the second coordinate system, calculates a third azimuth value and a third elevation value of the third coordinate value as well as a fourth azimuth value and a fourth elevation value of the fourth coordinate value so as to obtain a second azimuth deviation and a second elevation deviation, and substitutes the third azimuth value, the third elevation value, the second azimuth deviation and the second elevation deviation into a coordinate error model to obtain a plurality of error model coefficients for determining the coordinate error model.

14. The pointing error correcting system as set forth in claim 13, wherein the processing module further substitutes the third azimuth value and the third elevation value into the coordinate error model to obtain a third azimuth deviation and a third elevation deviation, adds the third azimuth deviation to the third azimuth value to obtain a fifth azimuth value, adds the third elevation deviation to the third elevation value to obtain a fifth elevation value, obtains a fifth coordinate value from the fifth azimuth value and the fifth elevation value, transforms the fifth coordinate value to the first coordinate system to obtain a sixth coordinate value, and transforms the sixth coordinate value into a sixth azimuth value and a sixth elevation value.

15. The pointing error correcting system as set forth in claim 14, wherein the processing module corrects the driving module according to the error value to drive the tracker pointing the celestial body in such a manner that the processing module controls the driving module according to the control command formed by the sixth azimuth value and the sixth elevation value to drive the tracker.

* * * * *